(12) United States Patent
Dudek et al.

(10) Patent No.: US 10,309,870 B2
(45) Date of Patent: Jun. 4, 2019

(54) ANGULAR ORIENTATION OF CAMSHAFTS AND CRANKSHAFT OF AN ENGINE ASSEMBLY

(71) Applicants: Kenneth D Dudek, Howell, MI (US); Mark S Hannon, SouthLyon, MI (US)

(72) Inventors: Kenneth D Dudek, Howell, MI (US); Mark S Hannon, SouthLyon, MI (US)

(73) Assignee: FCA US LLC, Auburn Hills, MI (US)

( * ) Notice: Subject to any disclaimer, the term of this patent is extended or adjusted under 35 U.S.C. 154(b) by 178 days.

(21) Appl. No.: 15/620,155

(22) Filed: Jun. 12, 2017

(65) Prior Publication Data

US 2017/0363511 A1  Dec. 21, 2017

Related U.S. Application Data (60) Provisional application No. 62/350,264, filed on Jun. 15, 2016.

(51) Int. Cl.
  *G01M 15/06* (2006.01)
  *F01L 1/34* (2006.01)
  (Continued)

(52) U.S. Cl.
  CPC .............. *G01M 15/06* (2013.01); *F01L 1/02* (2013.01); *F01L 1/053* (2013.01); *F01L 1/34* (2013.01);
  (Continued)

(58) Field of Classification Search
  USPC ......................................... 73/114.26, 114.27
  See application file for complete search history.

(56) References Cited

U.S. PATENT DOCUMENTS 3,409,989 A  11/1968  Herbert et al.
4,302,882 A  12/1981  Bradley et al.
(Continued)

FOREIGN PATENT DOCUMENTS

CN  104249320 A  12/2014
DE  20316281 U1  2/2004
(Continued)

OTHER PUBLICATIONS

International Search Report and Written Opinion dated Sep. 29, 2017 for International Application No. PCT/US2017/037356, International Filing Date Jun. 14, 2017.

*Primary Examiner* — Eric S. McCall
(74) *Attorney, Agent, or Firm* — Ralph E. Smith (57) ABSTRACT

A fixture assembly includes a primary gage member, camshaft gages, a crankshaft gage and an engine gage, all of which have planar datum surfaces that are each dimensionally located relative to the primary gage member planar datum surface. The engine gage includes an engine datum surface, and is sized and shaped to receive, support and dimensionally locate the engine. An engine block datum surface is configured to be positioned on the engine datum surface thereby locating the engine relative to the primary gage member datum surface. The primary, first, second and engine datum surfaces are fixed in a parallel relationship to each other so as to form a parallel alignment system such that when the fixture assembly datum surfaces engage and form parallel alignment with the corresponding engine datum surfaces, the camshafts and crankshaft are angularly located in a predetermined angular orientation for proper timing of the engine assembly.

10 Claims, 9 Drawing Sheets

(51) Int. Cl.
  *F02B 77/08* (2006.01)
  *F01L 1/02* (2006.01)
  *F01L 1/053* (2006.01)

(52) U.S. Cl.
  CPC ........... *F02B 77/08* (2013.01); *F01L 2103/01* (2013.01); *F01L 2103/02* (2013.01)

(56) References Cited

U.S. PATENT DOCUMENTS

| | | | |
|---|---|---|---|
| 5,463,898 A * | 11/1995 | Blander | F01L 1/46 73/114.26 |
| 5,533,274 A | 7/1996 | Westling | |
| 5,787,849 A * | 8/1998 | Mitchell | F01L 1/053 123/193.5 |
| 6,145,212 A | 11/2000 | Geise et al. | |
| 6,283,075 B1 * | 9/2001 | Schafer | F01L 1/3442 123/90.17 |
| 6,287,182 B1 | 9/2001 | Dwyer | |
| 6,438,833 B1 | 8/2002 | Cook et al. | |
| 6,886,422 B2 | 5/2005 | King et al. | |
| 2002/0056427 A1 * | 5/2002 | Lee | F01L 1/34 123/90.17 |
| 2005/0115527 A1 * | 6/2005 | Kinugawa | F01L 1/3442 123/90.17 |
| 2009/0235524 A1 * | 9/2009 | Iwagami | F01L 1/02 29/888.01 |
| 2010/0300387 A1 * | 12/2010 | Hu | F01L 1/047 123/90.17 |
| 2015/0219021 A1 * | 8/2015 | Pagliaro | F01L 1/047 123/90.15 |

FOREIGN PATENT DOCUMENTS

| | | |
|---|---|---|
| DE | 102008037354 A1 | 3/2009 |
| FR | 2977515 A1 | 1/2013 |
| JP | S6294234 A | 4/1987 |

* cited by examiner

ANGULAR ORIENTATION OF CAMSHAFTS AND CRANKSHAFT OF AN ENGINE ASSEMBLY

CROSS-REFERENCE TO RELATED APPLICATIONS

This application claims benefit of U.S. Provisional Application Ser. No. 62/350,264 filed on Jun. 15, 2016. The disclosure of the above application is incorporated herein by reference in its entirety.

FIELD

The present application relates generally to valvetrain angular orientation and timing for an engine and, more particularly, to a system and method for angularly orientating camshafts and a crankshaft of an engine during assembly of the engine.

BACKGROUND

Today's engines often include single or dual overhead camshafts typically driven by timing chains and a drive sprocket or sprockets (or gears) off a front of the crankshaft, and may include one or more cam phasers. Chain guides, tensioner arms and tensioning devices (which may be hydraulic or spring actuated) are used to maintain chain tension. A sprocket or the like is attached for rotation with each camshaft and is driven rotationally by the timing chain, which is driven by the crankshaft sprocket. The timing of the opening and closing of valves of the engine in relation to the crankshaft is important due to a typically low clearance of the pistons to the intake valves when opening, and to the exhaust valves when closing.

Current orientation and timing arrangements for such engines typically include gage devices for each camshaft and a gage device for the crankshaft. Each of these gage devices typically includes dowel pins that engage a circular pocket in the engine block and a circular pocket in the respective component, thereby orientating each component relative to the engine block. While such orientation devices or systems work well for their intended purpose, they utilize multiple components that increase cost and complexity as well as potentially introduce additional tolerance variability into the engine timing and assembly process. As a result, there remains a need for improvement in the relevant art.

SUMMARY

According to one example aspect of the invention, a system for locating rotating components of an engine assembly for timing of the engine assembly is presented. In one exemplary implementation, the system comprises a fixture assembly that includes a primary gage member, a plurality of camshaft gage members, a crankshaft gage member and an engine assembly gage member. The primary gage member includes a fixture datum surface that is planar, and the plurality of camshaft gage members are adjustably coupled to only the primary gage member and located relative to only the fixture datum surface. Each of the plurality of camshaft gage members includes a first datum surface that is planar and configured to engage a corresponding camshaft planar datum surface of a camshaft of the engine assembly. The crankshaft gage member is adjustably coupled to only the primary gage member and located relative to only the fixture datum surface, the crankshaft gage member has a second datum surface that is planar and configured to engage a corresponding crankshaft planar datum surface of a crankshaft of the engine assembly. The engine assembly gage member is connected to the primary gage member and located relative to the fixture datum surface. The engine assembly gage member includes an engine datum surface, and the engine assembly gage member is sized and shaped to receive, support and locate the engine assembly. A block datum surface of a block of the engine assembly is positioned on the engine datum surface thereby locating the engine assembly relative to the fixture datum surface. The fixture, first, second and engine assembly datum surfaces of the fixture assembly are fixed in a parallel relationship to each other so as to form a parallel alignment system such that when the datum surfaces of the fixture assembly engage and form parallel alignment with the corresponding datum surfaces of the engine assembly positioned on the engine datum surface, the camshaft and crankshaft are angularly located in a predetermined angular orientation for proper timing of the engine assembly.

In some implementations, when the datum surfaces of the fixture assembly engage and form parallel alignment with the corresponding datum surfaces of the engine assembly positioned on the engine datum surface, the camshaft and crankshaft are automatically positioned in a predetermined angular orientation for proper timing of the engine assembly.

In some implementations, each of the plurality of camshaft gage members and the crankshaft gage member are vertically adjustable toward and away from the primary gage member. In some implementations, each of the plurality of camshaft gage members and the crankshaft gage member include an upper gage member adjustably coupled to the primary gage member and a lower gage member telescopically adjustable relative to its respective upper gage member. In some implementations, the engine gage member is located relative to and suspended from the primary gage member.

In some implementations, when the engine assembly is positioned on the engine datum surface of the engine gage member, the primary gage member is positioned above the engine assembly and the engine gage member is positioned below the engine assembly.

In some implementations, each of the plurality of camshaft gage members and the crankshaft gage member are laterally adjustable toward and away from a camshaft centerline and a crankshaft centerline, respectively. In some implementations, each of the plurality of camshaft gage member sand crankshaft gage members are fore-aft adjustable along a centerline of the crankshaft and camshafts. In some implementations, each of the camshaft gage members, the crankshaft gage member and the engine assembly gage member are all connected to and dimensionally located only from the datum surface of the primary gage member.

In some implementations, the engine assembly includes dual overhead camshafts and the fixture assembly includes four camshaft gage members. In some implementations, the engine assembly includes a V-type engine, a W-type engine, an I-type engine, etc.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

In accordance with an exemplary aspect of the invention and as will be discussed in greater detail herein, a gage system and method are provided for angularly orientating camshafts and a crankshaft of an engine relative to an external datum or gage surface. In one exemplary implementation, the external datum or gage surface is associated with a fixture assembly. In one exemplary implementation, the cylinder heads and cylinder block of the engine are also dimensionally and/or angularly located relative to the datum surface of the fixture assembly separately from the camshafts and crankshaft, which are all also dimensionally and/or angularly located to the datum surface of the fixture assembly. Upon locating the camshafts and crankshaft as discussed above, the fixture assembly fixes or clamps these valvetrain components such that the components are temporarily fixed for continued assembly of the timing system and/or other valvetrain components.

In this fixing or clamping process, the camshafts and crankshaft are fixed relative to each other and not the engine block, thereby reducing angular tolerance stack-ups and variability from engine to engine. In one exemplary implementation, the datum or gage surfaces on the camshafts each include a large flat or planar surface configured to receive or engage a similarly large flat or planar surface of the gage members of the fixture assembly. For ease of discussion, it will be appreciated that use of the term located, such as located to the primary fixture datum surface, means that the referenced component is dimensionally, including angularly, positioned relative thereto to serve as a gage member relative to the primary datum surface.

Figure 1:
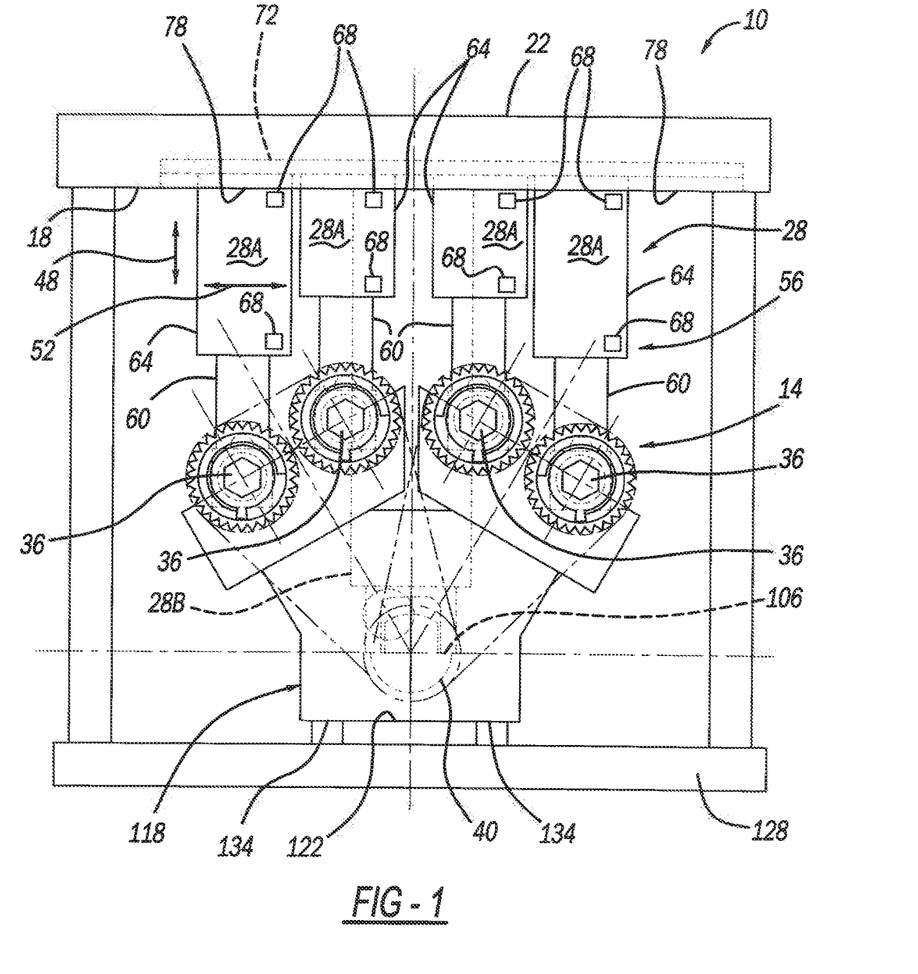
FIG. 1 is a front view of an exemplary system and methodology for orientating the camshafts and crankshaft of an engine during assembly thereof in accordance with the principles of the present application.
Figure 2:
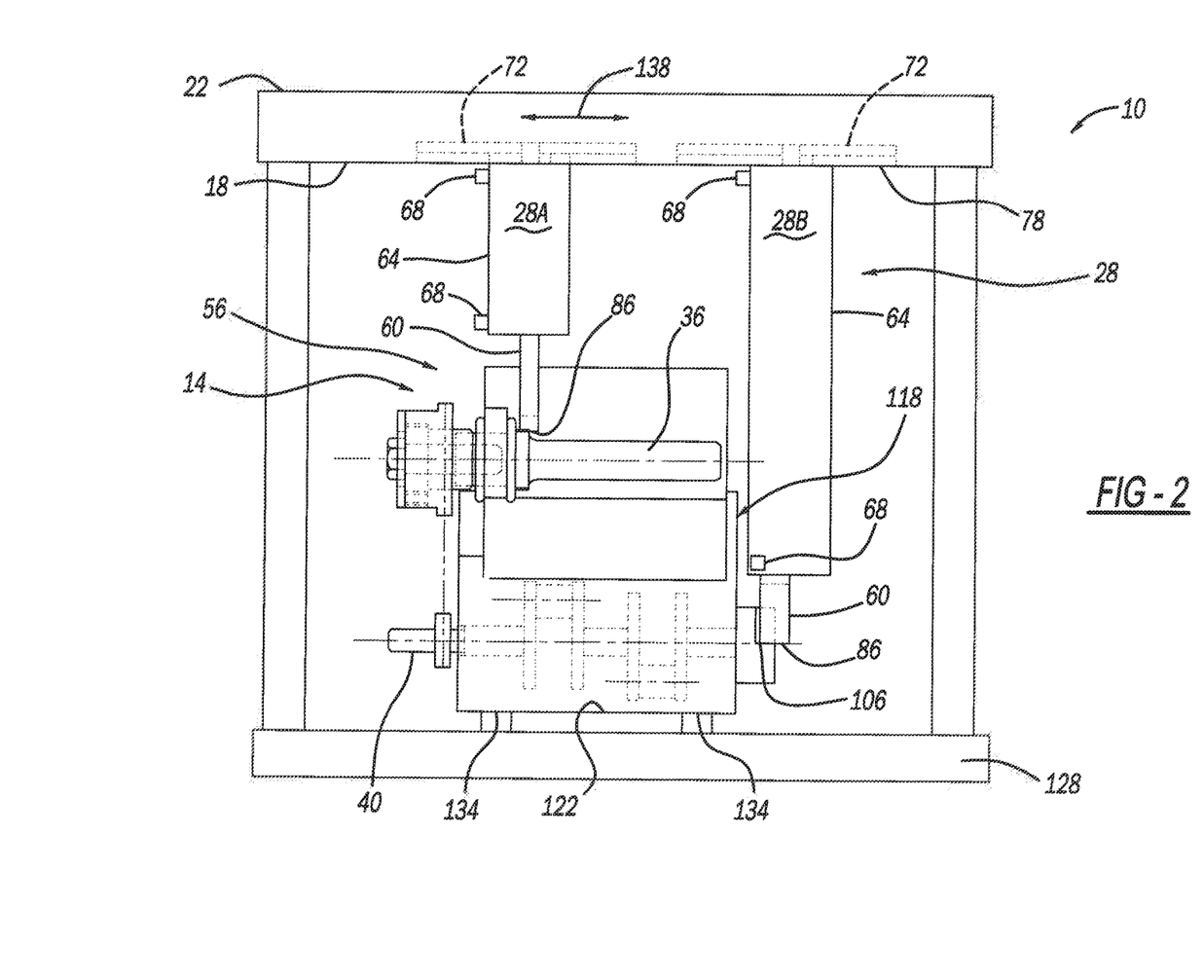
FIG. 2 is a side view of the exemplary system of FIG. 1 in accordance with the principles of the present application.

Turning now to the drawings, FIGS. 1 and 2 illustrate an exemplary fixture assembly 10 configured to receive and dimensionally locate an exemplary engine assembly (or partial assembly) 14 and certain valvetrain components thereof relative thereto. In one exemplary implementation, the fixture assembly 10 receives and dimensionally locates the engine assembly 14 relative to a horizontal datum surface 18 of the fixture assembly 10. In one exemplary implementation, horizontal datum surface 18 is a gage or datum surface of an upper horizontal gage member 22 of fixture assembly 10. The fixture assembly also includes a plurality of gage members 28 (collectively referred to as gage members 28, and individually referred to as gage members 28A or 28B) all angularly located or orientated relative to the horizontal datum surface 18 of the fixture assembly 10. In one exemplary implementation, there is a separate gage member 28A for each camshaft 36 of engine assembly 14 and a separate gage member 28B for the crankshaft 40 of engine assembly 14. Thus, for the exemplary dual overhead camshaft V-type engine assembly 14, the fixture assembly 10 would include, among other features and members, five gage members 28, as shown for example in FIGS. 1 and 2.

In one exemplary implementation, each of these gage members 28 are optionally vertically 48 and optionally horizontally (e.g., laterally and/or fore-aft) 52, 138 moveable relative to the datum surface 18 of the fixture assembly 10, but will however maintain their angular orientation/relationship to the datum surface 18 during such movement. In the exemplary implementation illustrated, each gage member 28 is orientated perpendicular to the datum surface 18, as shown in FIGS. 1 and 2.

In one exemplary implementation and as briefly discussed above, the gage members 28 are each individually adjustable both horizontally or laterally and vertically relative to datum surface 18 and thus fixture member 22. For this implementation, the gage members 28 each include a vertical length adjustment, such as via the telescoping arrangement 56 shown in the various figures of the application, where each gage member 28 includes a lower gage member 60 and an upper gage member 64. Lower gage member 60 is telescopically received in and vertically adjustable relative to upper gage member 64. A locking device 68 may be used to lock a position of the lower and upper gage members 60, 64 relative to each other. The locking device may be internal or external to the leg, and may be electronically or manually controlled. Examples of such a locking device include a manual locking wedge or pin, a solenoid actuated locking pin or arrangement, etc. With regard to lateral or horizontal adjustment, each upper gage member 64 may be positioned in a track or guide 72 of the upper datum member 28 and located relative to the datum surface 18, such as via an upper datum surface 78 of upper gage members 64. Another locking device 68 may be utilized to temporarily or permanently lock or secure the lateral position of the gage members 28 relative to the upper gage member 22.

Each gage member 28 (and/or lower gage member 60) includes a lower or bottom gage or datum surface 86 configured to engage the corresponding gage or datum surface of its associated valvetrain component, e.g., the camshafts 36 or crankshaft 40. In the exemplary implementation illustrated, the lower gage or datum surface 86 of each gage member 28 of the fixture assembly includes a large flat or planar gage surface 86 parallel to the datum surface 18 of the fixture assembly upper gage member 22. Use of the large planar surface 86 provides for improved location accuracy as well as improved timing repeatability between engines and bank to bank relative timing on V-type engines.

Turning now to the valvetrain components, each camshaft 36 includes a large flat planar gage or datum surface 94 fixed thereto. In the examples illustrated, this datum surface 94 is located at the forward end of the camshaft proximate the forward end of the engine adjacent the timing drive components, such as cam phasers or chain sprockets. In one exemplary implementation, gage or datum surface 94 is integrally formed on camshaft 36. During manufacturing of the camshaft 36, each cam lobe 98, as well as any other angular orientation dependent features, are angularly located relative to this large planar datum surface 94.

Figure 3:
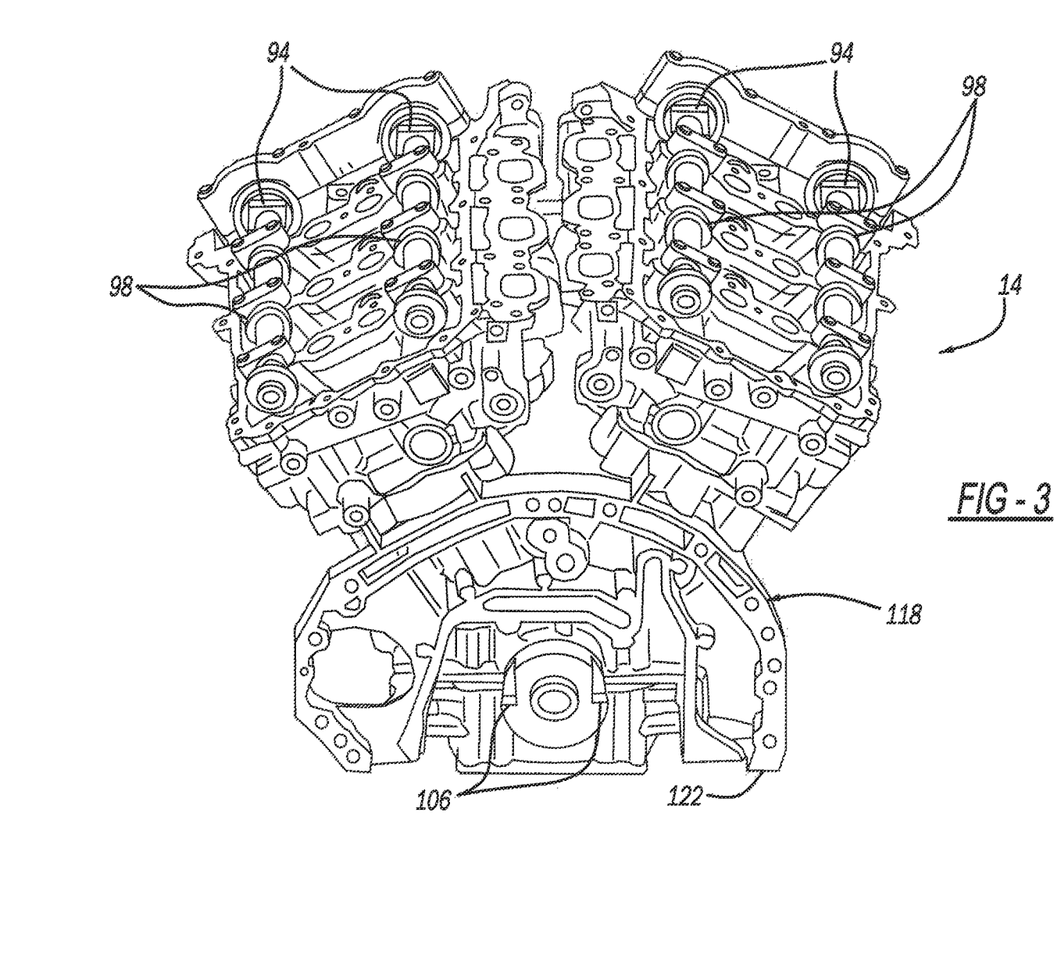
FIG. 3 is a perspective view of an exemplary engine having gage or datum flat surfaces on each camshaft and on the crankshaft in accordance with the principles of the present application.
Figure 4:
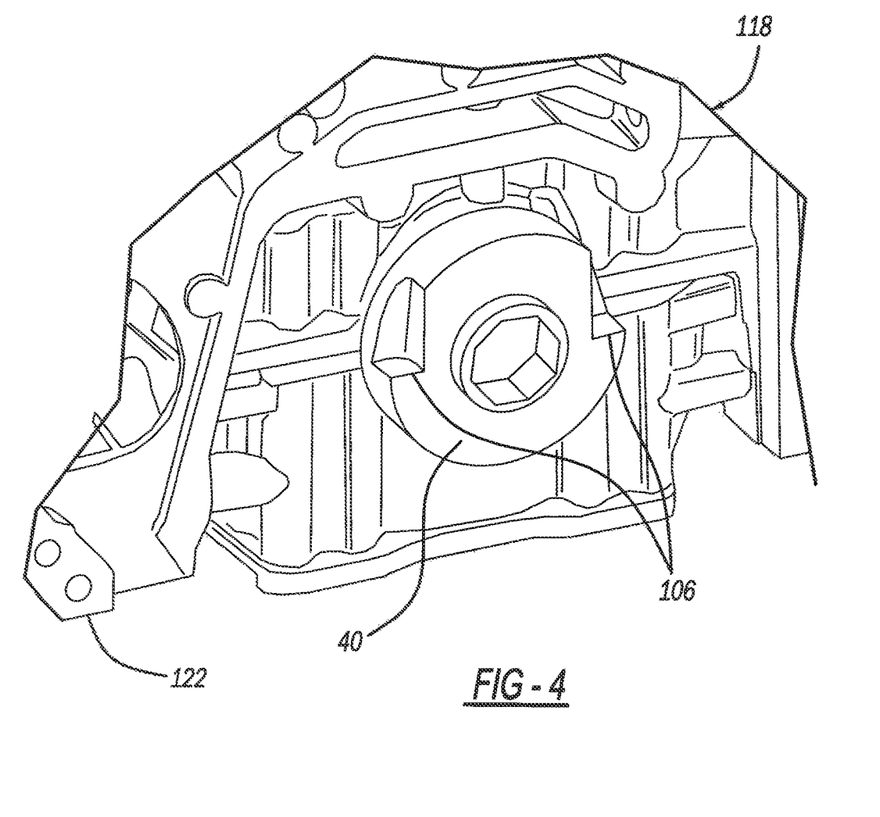
FIG. 4 is another view of the engine of FIG. 3 highlighting the gage or datum flat surfaces of the crankshaft of the engine in accordance with the principles of the present application.
Figure 5:
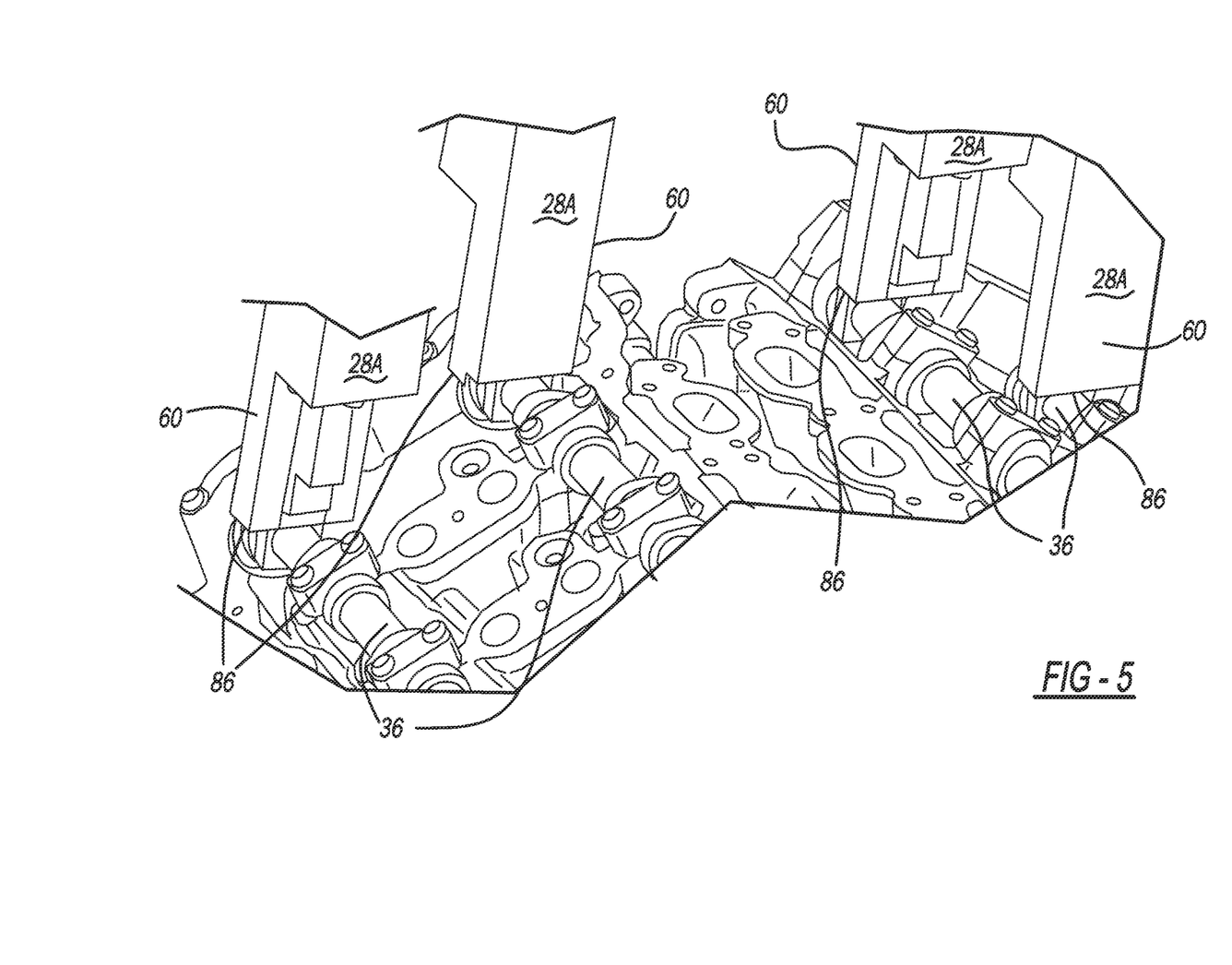
FIG. 5 is a partial perspective view of the system of FIG. 1 highlighting the gage members of the gage fixture assembly engaging the gage or datum flat surfaces of the camshafts in accordance with the principles of the present application.
Figure 6:
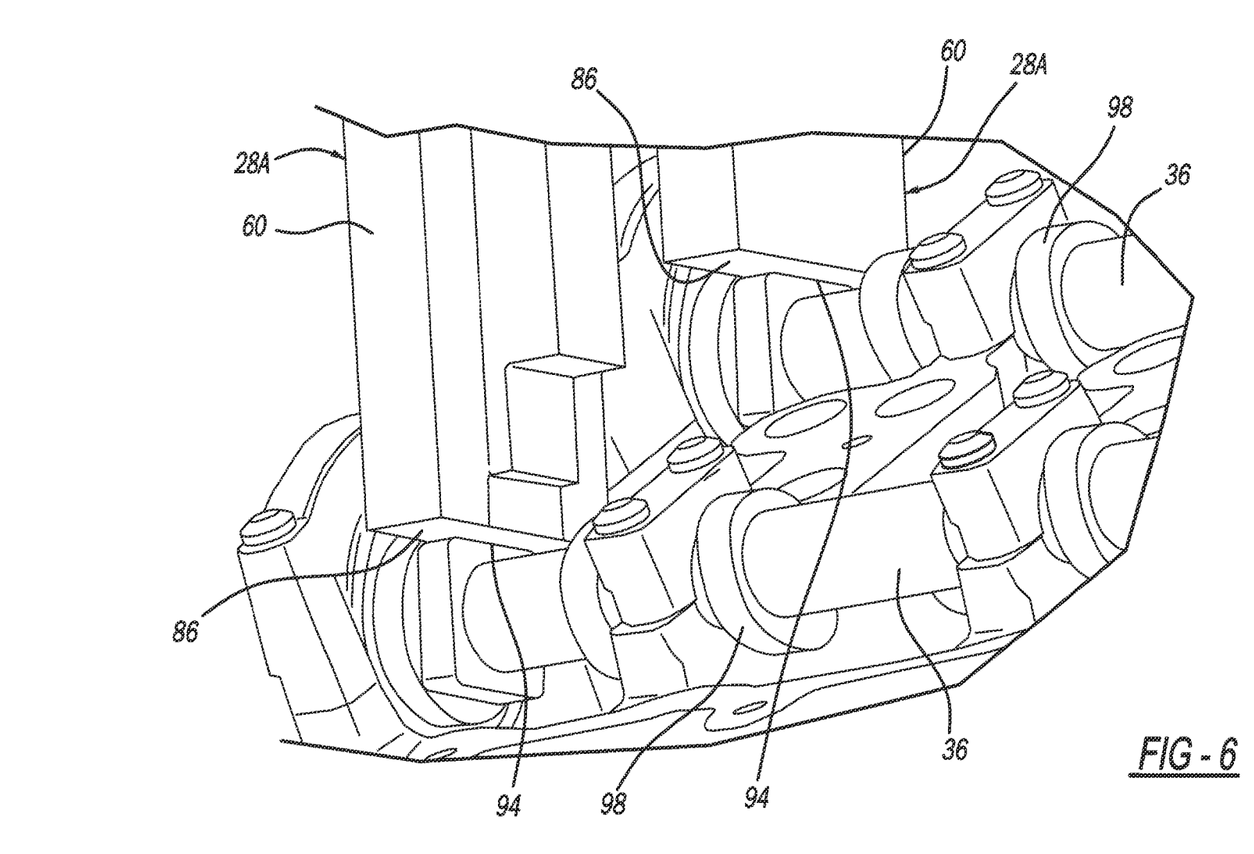
FIG. 6 is another partial perspective view of the system of FIG. 1 highlighting the gage members of the gage fixture assembly engaging the gage or datum flat surfaces of the camshafts in accordance with the principles of the present application.
Figure 7:
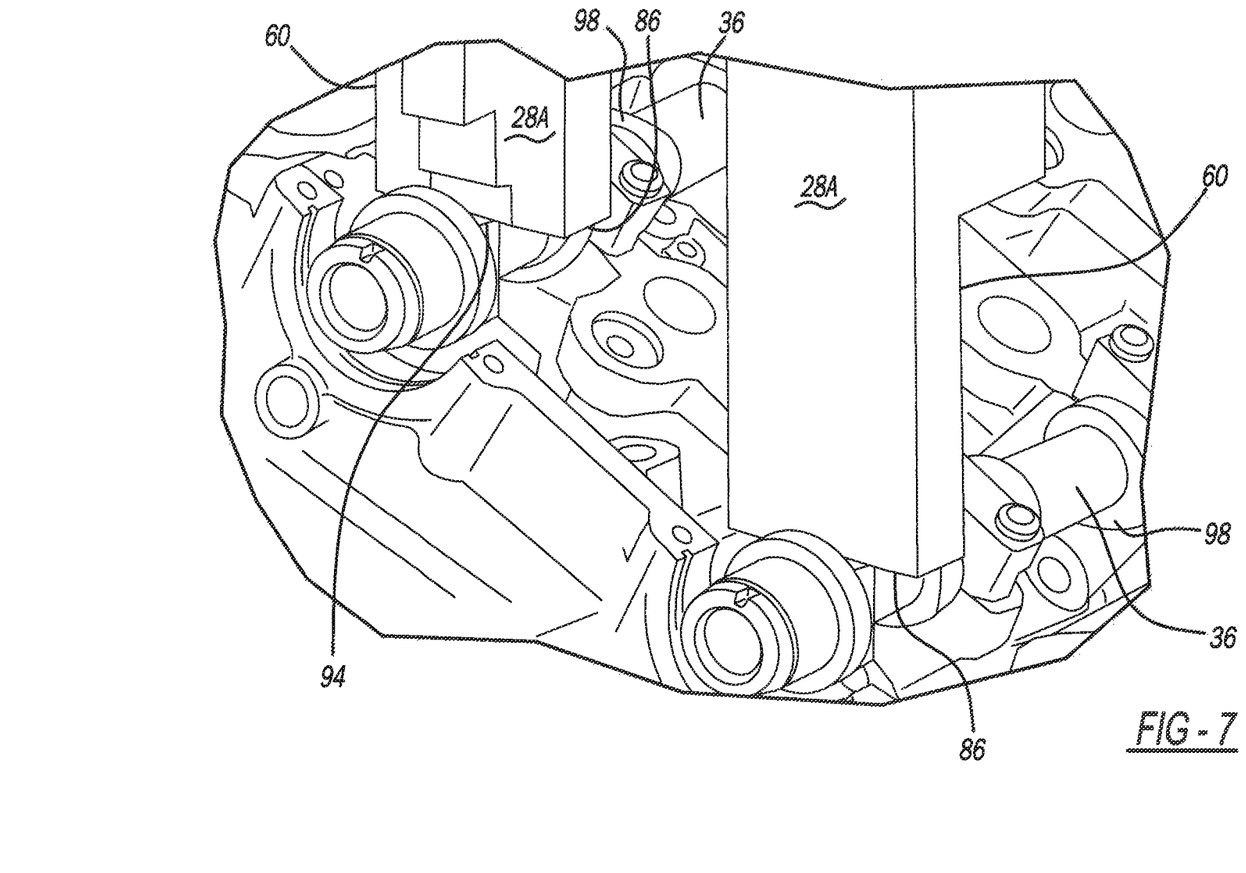
FIG. 7 is another partial perspective view of the system of FIG. 1 highlighting the gage members of the gage fixture assembly engaging the gage or datum flat surfaces of the camshafts in accordance with the principles of the present application.
Figure 8:
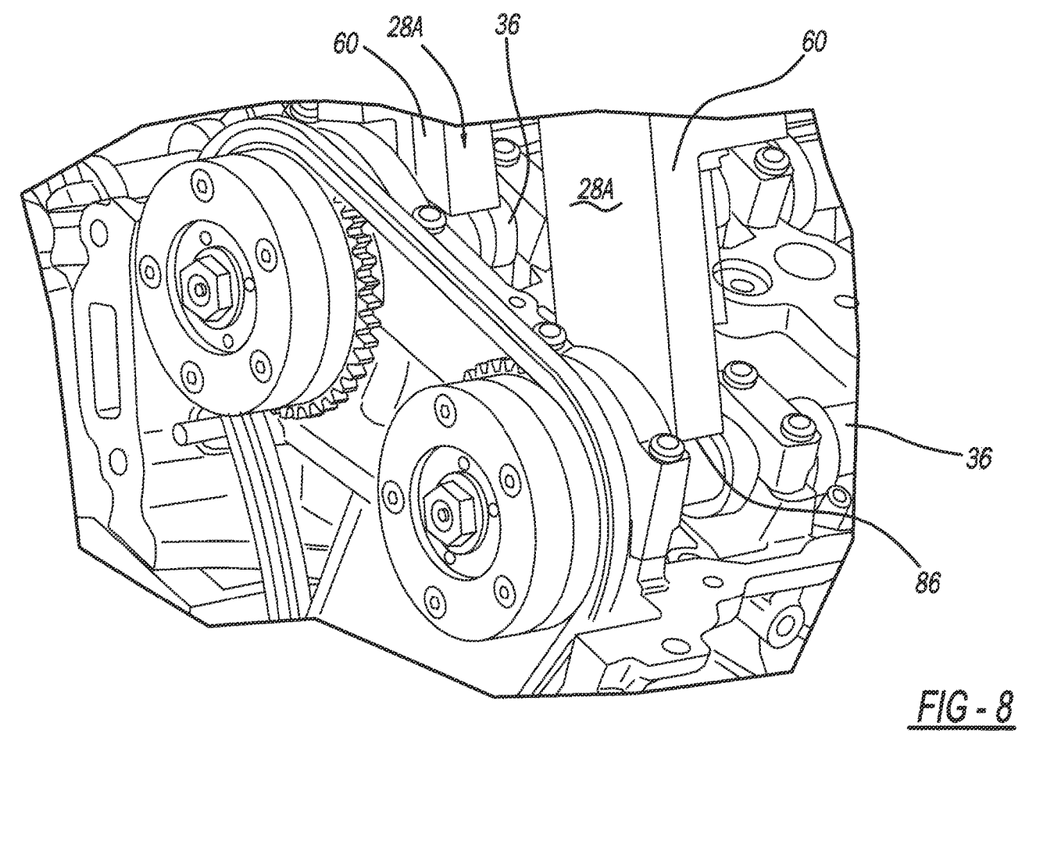
FIG. 8 is another partial perspective view of the system of FIG. 1 highlighting the gage members of the gage fixture assembly engaging the gage or datum flat surfaces of the camshafts in accordance with the principles of the present application.
Figure 9:
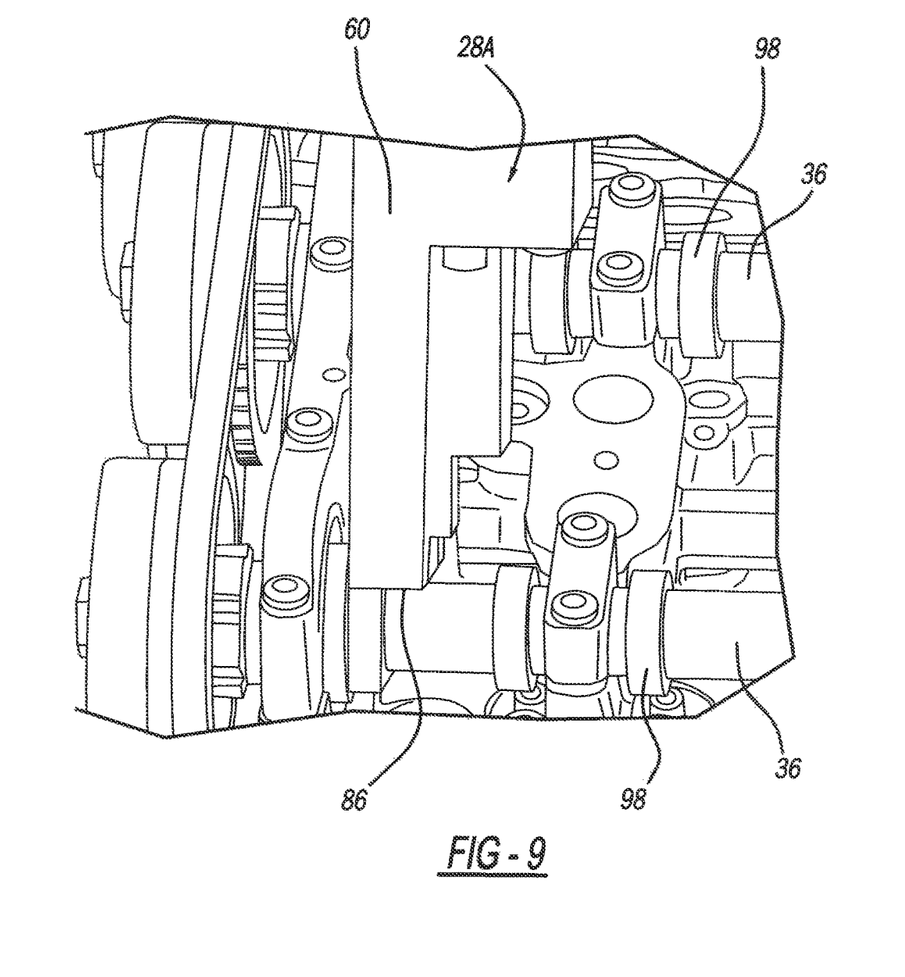
FIG. 9 is a partial side view of the system of FIG. 1 highlighting the gage members of the gage fixture assembly engaging the gage or datum flat surfaces of the camshafts in accordance with the principles of the present application.

Similarly, the crankshaft 40 includes a large planar datum surface 106, either in the form of one large surface or in the form of two surfaces on opposite sides (horizontally) of a centerline of the crankshaft, as shown for example in FIGS. 2, 3 and 4. Like the camshafts 36 discussed above, the timing dependent features of the crankshaft are manufactured relative to this planar datum surface or surfaces 106. In the example illustrated, the datum surfaces are formed on a rearward end of the crankshaft extending from a rear face of the engine block.

The fixture assembly also includes, in one exemplary implementation, a gage or datum surface for locating the engine assembly 14 relative to the fixture assembly 10. In one example, the engine assembly 14 includes an engine block 118 that includes a lower datum or gage surface 122. The fixture assembly 10 also includes a block gage member 128 having a horizontal and/or planar datum or gage surface 134 configured to receive the datum or gage surface 122 of engine block 118. The block gage member 128 and its datum surface are located relative to the datum surface 18 of upper gage member 22. Thus, all gage or datum surfaces of fixture assembly 10 are located relative to datum surface 18 and, in one exemplary implementation, are all planar and parallel to each other. In other words, in this exemplary implementation, all of the fixture datum surfaces are fixed in a planar parallel relationship to each other.

With particular reference to FIGS. 1-2 and 5-9 and continued reference to FIGS. 3-4, use of the fixture assembly 10 to angularly orientate the camshafts 36 and crankshaft 40 relative to the fixture assembly 10 and thus each other using the parallel alignment system of fixture assembly 10 will now be discussed in greater detail.

As briefly discussed above, the partial and complete engine assembly with the camshafts 36 and crankshaft 40 assembled thereto, is received in and/or positioned in the fixture assembly 10. In the exemplary implementation illustrated, the engine assembly 14 is the dual overhead camshaft engine assembly discussed above. The engine assembly 14 is located relative to the horizontal datum surface 18 of the fixture assembly 10, as discussed above. For example, the gage surface 122 of engine block 118 is placed on and supported by the gage surface 134 of block gage member 128, which are located relative to gage surface 18. With the engine assembly 14 located relative to gage surface 18, the gage members 28 are then moved into horizontal alignment with the datum surfaces 94, 106 of their respective valvetrain components 36, 40. It will be appreciated, however, that this may not be necessary for a fixture assembly 10 dedicated to one engine assembly arrangement.

The gage members 28 are then moved vertically into engagement with their respective valvetrain components 36, 40 such that the large planar datum surfaces 86 of the gage members 28A, 28B engage the corresponding large planar datum surfaces 94, 106 of the valvetrain components 36, 40. With this engagement, the planar datum surfaces 86 of the gage members 28A, 28B are parallel to the planar datum surfaces 94, 106 of the corresponding valvetrain components 36, 40 and thus the planar datum surface 18 of upper gage member 22. This sets the proper angular orientation of the camshaft(s) and crankshaft for the engine via the parallel alignment system and methodology, which provides for notably greater accuracy than use of dowel pins and corresponding circular pockets located relative to the engine block. In one exemplary implementation, the engagement and parallel alignment of the of the planar datum surfaces 86 with the corresponding planar datum surfaces 94, 106 automatically sets the proper angular orientation of the camshaft(s) and crankshaft for the engine via the parallel alignment system.

The gage members 28 are then temporarily locked or fixed, thereby setting the angular orientation of the camshafts and crankshafts for timing the engine and further assembly of the valvetrain/timing components of the engine. In this process, the camshafts and crankshaft are angularly located relative to each of other via the datum surface of the fixture assembly and not specifically to the block.

The fixture assembly and associated large planar datum surfaces of the camshafts and crankshaft discussed above provide for angularly locating and setting the timing of all of these shafts at the same time using the parallel alignment method discussed above. This system and method provides for use of improved datum surfaces and locating the same relative to an external datum of the fixture assembly and not the engine block, thereby providing for improved accuracy and reduced timing variation between engines. In an exemplary implementation where the gage fixture includes movement capability of the gage members, the fixture assembly can accommodate some positional movement of the shaft centerlines without affecting angular timing orientation.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for locating rotating components of an engine assembly for timing of the engine assembly, the system comprising:
   a fixture assembly including:
      a primary gage member having a primary datum surface that is planar;
      a plurality of camshaft gage members adjustably coupled to only the primary gage member and dimensionally located relative to only the primary datum surface, each of the plurality of camshaft gage members having a first datum surface that is planar and configured to engage a corresponding camshaft planar datum surface of a camshaft of the engine assembly;
      a crankshaft gage member adjustably coupled to only the primary gage member and dimensionally located relative to only the primary datum surface, the crankshaft gage member having a second datum surface that is planar and configured to engage a corresponding crankshaft planar datum surface of a crankshaft of the engine assembly;

an engine assembly gage member connected to the primary gage member and dimensionally located relative to the primary datum surface, the engine assembly gage member including an engine datum surface, the engine assembly gage member sized and shaped to receive, support and dimensionally locate the engine assembly, wherein a block datum surface of a block of the engine assembly is configured to be positioned on the engine datum surface thereby dimensionally locating the engine assembly relative to the primary datum surface;

wherein the primary, first, second and engine assembly datum surfaces of the fixture assembly are fixed in a parallel relationship to each other so as to form a parallel alignment system such that when the datum surfaces of the fixture assembly engage and form parallel alignment with the corresponding datum surfaces of the engine assembly positioned on the engine datum surface, the camshaft and crankshaft are angularly located in a predetermined angular orientation for proper timing of the engine assembly.

2. The system of claim 1, wherein when the datum surfaces of the fixture assembly engage and form parallel alignment with the corresponding datum surfaces of the engine assembly positioned on the engine datum surface, the camshaft and crankshaft are automatically positioned in a predetermined angular orientation for proper timing of the engine assembly.

3. The system of claim 1, wherein each of the plurality of camshaft gage members and the crankshaft gage member are vertically adjustable toward and away from the primary gage member.

4. The system of claim 3, wherein each of the plurality of camshaft gage members and the crankshaft gage member include an upper gage member adjustably coupled to the primary gage member and a lower gage member telescopically adjustable relative to its respective upper gage member.

5. The system of claim 1, wherein the engine gage member is dimensionally located relative to the primary datum surface and suspended from the primary gage member.

6. The system of claim 5, wherein when the engine assembly is positioned on the engine datum surface of the engine gage member, the primary gage member is positioned above the engine assembly and the engine gage member is positioned below the engine assembly.

7. The system of claim 1, wherein each of the plurality of camshaft gage members and the crankshaft gage member are laterally adjustable toward and away from a camshaft centerline and a crankshaft centerline, respectively.

8. The system of claim 1, wherein each of the plurality of camshaft gage members and the crankshaft gage member are fore-aft adjustable along camshaft centerlines and a crankshaft centerline, respectively.

9. The system of claim 1, wherein the engine assembly includes dual overhead camshafts and the fixture assembly includes four camshaft gage members.

10. The system of claim 1, wherein each of the camshaft gage members, the crankshaft gage member and the engine assembly gage member are all connected to and dimensionally located only from the datum surface of the primary gage member.

* * * * *